W. A. HAYDEN.
DEMOUNTABLE WHEEL RIM.
APPLICATION FILED APR. 24, 1919.
1,362,306.
Patented Dec. 14, 1920.
2 SHEETS—SHEET 1.
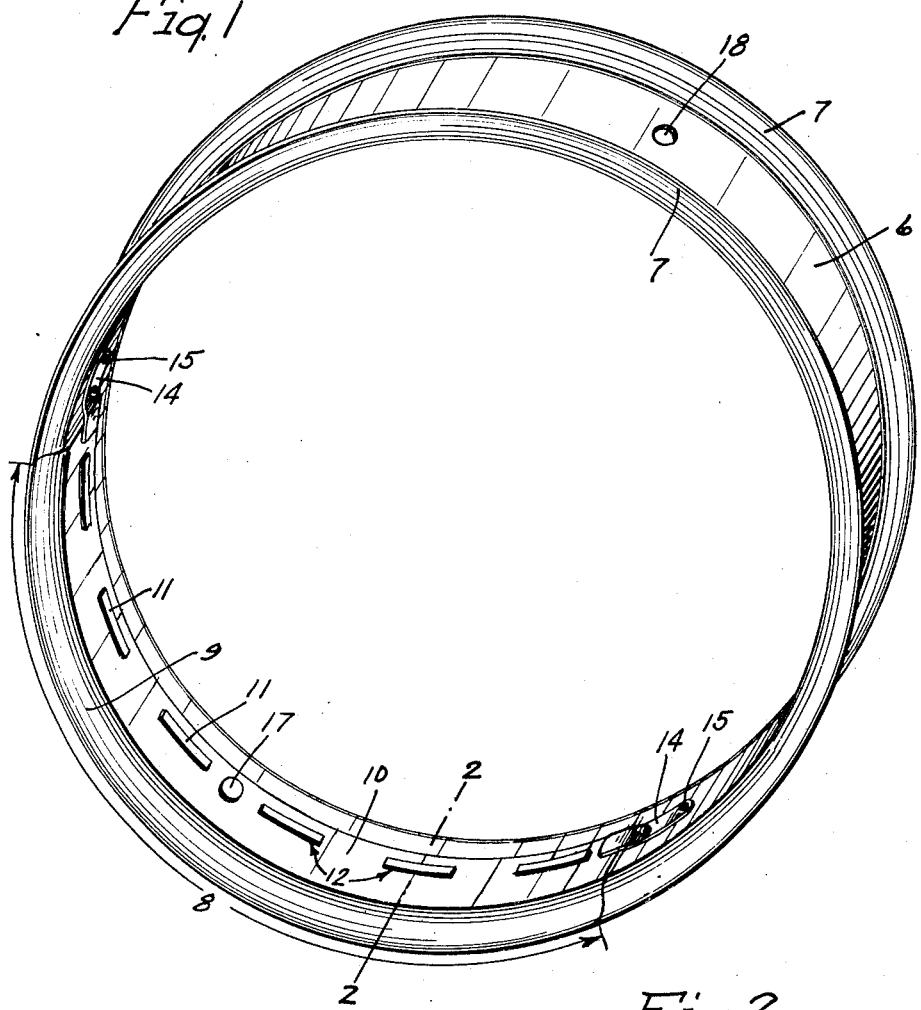
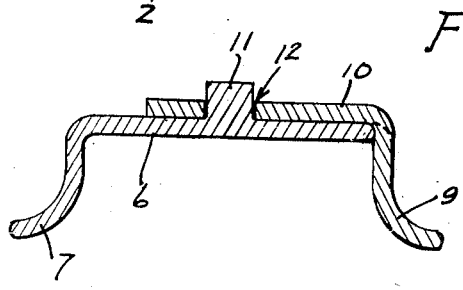
INVENTOR
Willard A. Hayden
BY HIS ATTORNEYS

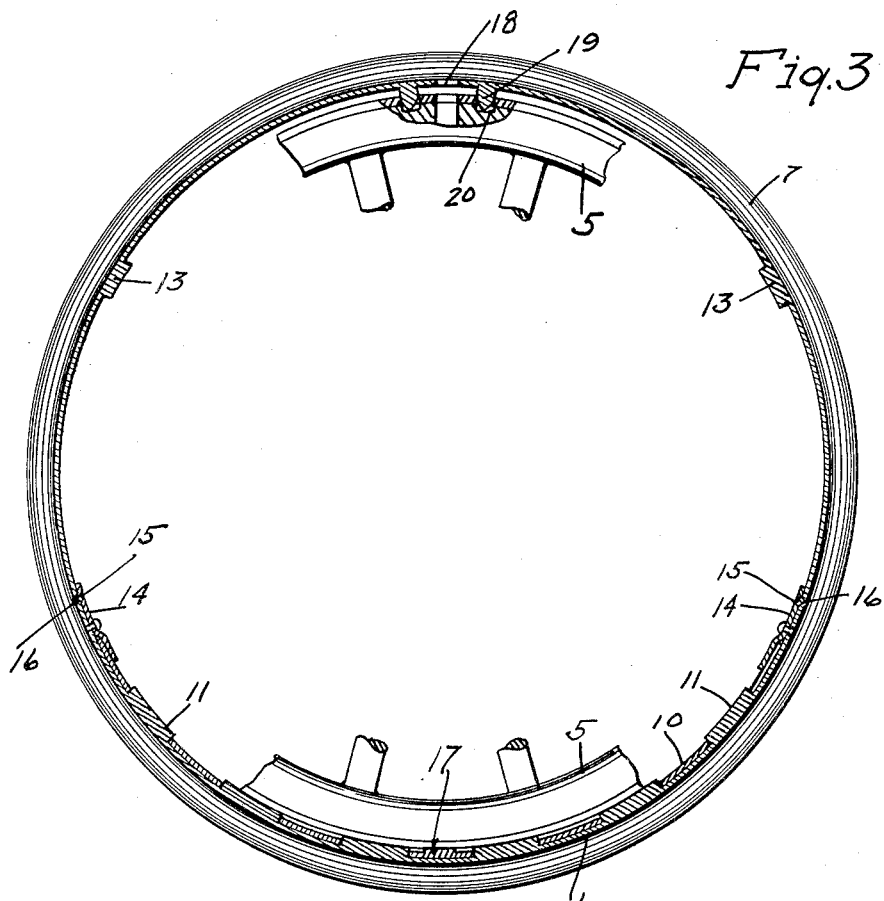
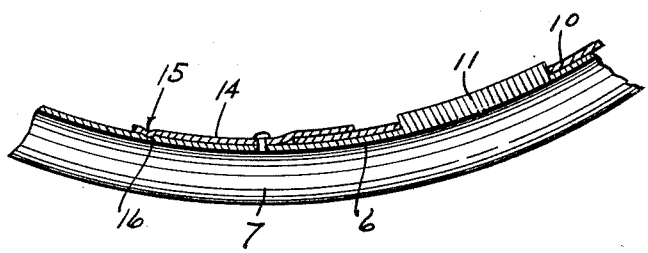

UNITED STATES PATENT OFFICE.

WILLARD A. HAYDEN, OF MINNEAPOLIS, MINNESOTA, ASSIGNOR TO THE HAYDEN MANUFACTURING COMPANY, OF MINNEAPOLIS, MINNESOTA, A CORPORATION OF MINNESOTA.

DEMOUNTABLE WHEEL-RIM.

1,362,306.  Specification of Letters Patent.  Patented Dec. 14, 1920.

Application filed April 24, 1919. Serial No. 292,470.

*To all whom it may concern:*

Be it known that I, WILLARD A. HAYDEN, a citizen of the United States, residing at Minneapolis, in the county of Hennepin and State of Minnesota, have invented certain new and useful Improvements in Demountable Wheel-Rims; and I do hereby declare the following to be a full, clear, and exact description of the invention, such as will enable other skilled in the art to which it appertains to make and use the same.

My invention relates to improvements in demountable wheel rims, and has for its object to provide such a rim which will securely hold a tire so that it will run true and at the same time makes the application of a tire thereto, or the removal of the same therefrom, extremely simple and the use of tools unnecessary.

To the above end, generally stated, the invention consists of the novel devices and combinations of devices hereinafter described and defined in the claims.

As it is well known, transversely divided wheel rims must be circumferentially expanded and contracted during the application of a tire thereto, and the removal of the same therefrom, and this action soon warps or twists the rim so that it will not again assume its original shape and hence will not hold a tire true, and when a tire does not run true it is subjected to additional wear.

To overcome this objectional feature of transversely divided wheel rims, I provide a rim that is continuous and unbroken throughout its entire circumference, and has formed in one of the flanges thereof, a gap through which a section of a tire may be moved laterally, when applying the tire to the rim or when removing the same therefrom. This gap in one of the rim flanges is normally closed by a removable flange section detachably secured to the wheel rim, as will hereinafter be described.

In the accompanying drawings, which illustrate the invention, like characters indicate like parts throughout the several views.

Referring to the drawings:—

Figure 1 is a perspective view of the improved wheel rim;

Fig. 2 is a transverse section taken on the line 2—2 of Fig. 1, on an enlarged scale;

Fig. 3 is a view of the improved wheel rim in central section, and also showing portions of a wheel and its felly-band on which is mounted said rim; and Fig. 4 is a detail view in section showing one of the connections between the wheel rim and its flange section, on an enlarged scale.

The numeral 5 indicates an automobile wheel having the customary felly-band on which my present invention is demountably mounted. The improved wheel rim 6, as previously stated, is continuous and unbroken throughout its entire circumference and is provided with side flanges 7 for holding a tire having straight sides. These flanges 7, of course, may be of various different shapes to hold clencher or other forms of tires.

In one of the rim flanges 7 is a gap 8 which, as shown, has a length equal to about one-third of the entire circumference of the rim 6. This gap 8 is normally closed by a flange section 9, alined with the respective flange 7 and provided with an integral rim segment 10, which overlaps the inner face of the wheel rim 6.

To detachably secure the rim segment 10 to the wheel rim 6, against both circumferential and lateral movements, there is formed with the wheel rim circumferentially spaced retaining lugs 11, arranged to fit into correspondingly formed slots 12, in the rim segment 10. These lugs 11 extend inward of the rim segment 10 and together with lugs 13, on the wheel rim 6, engage the felly-band on the wheel 5 and hold the wheel rim concentric to the axis of said wheel.

To hold the rim segment 10 and hence the flange section 9, against radial movement in respect to the wheel rim 6, two clips 14 are intermediately pivoted to the wheel rim and have one of their ends arranged to be turned into overlapping engagements with the ends of the rim segment 10. These clips 14 are frictionally held in operative positions by forming on their other ends small lugs 15, arranged to enter depressions in the wheel rim 6. To further hold the rim segment 10 against radial movement in respect to the wheel rim 6, there is formed with said rim segment, at a point centrally between its ends, a lug 17 arranged to engage the felly-band of the wheel 5.

Formed in the wheel rim 6, diametrically opposite the lug 17, is an aperture 18 to receive the valve stem of a tire, not shown.

A pair of circumferentially spaced lugs 19 are formed with the wheel rim 6, one on each side of the aperture 18, and arranged to enter seats 20, in the felly-band of the wheel 5 to hold the wheel rim 6 against circumferential movement with respect to said wheel. It will be noted that the ends of the flange section 9, have beveled engagement with the ends of the flange 7, at the gap 8, to make the application of said flange section to the wheel rim, or the removal of the same therefrom easy.

When applying a tire to the improved wheel rim 6, the flange section 9 is first removed from said rim by releasing the clips 14 and drawing said flange section radially inward to release its rim segment 10 from the lugs 11. With the flange section 9 removed from the rim 6, the valve stem of the tire is first inserted through the aperture 18 and the tire slipped over the flange 7, having the gap 8, and onto the wheel rim 6. The balance of the tire may then be pressed laterally through the gap 8 and onto the the wheel rim 6. After the tire is positioned on the wheel rim 6, the flange section 9 is again replaced and the improved wheel rim mounted on the wheel 5 and secured in the customary or any suitable way.

To remove the tire from the wheel rim the operation is just the opposite from that in applying the tire to the rim, and the first operation, after the flange section 9 is removed, is to draw a section of the tire through the gap 8. The balance of the tire may then be easily pulled over the flange 7 having the gap 8.

The above described wheel rim, while extremely simple, has in actual usage proven highly efficient for the purpose had in view. By leaving the wheel rim continuous and unbroken throughout its entire circumference, the same cannot get out of shape and will always remain true. The application of a tire to the improved wheel rim, or the removal of the same therefrom, can be done very quickly and without the use of tools.

What I claim is:—

1. A continuous unbroken wheel rim having tire-retaining flanges, in one of which is a gap, and a non-extensible tire-retaining flange section of constant form for closing the gap and movable radially inward to open said gap.

2. A continuous unbroken wheel rim having side flanges, in one of which is a gap, a flange section for closing said gap and having a rim segment arranged to overlap the inner face of the wheel rim, and circumferentially spaced lugs on the wheel rim arranged to engage the felly band of a wheel, said rim segment having slots with which certain of said lugs are arranged to interlock by a radial movement of the rim segment in respect to the wheel rim while maintaining its normal form, to lock said rim segment to the wheel rim.

3. A continuous unbroken wheel rim having side flanges, in one of which is a gap, a flange section for closing said gap and having a rim segment arranged to overlap the inner face of the wheel rim, circumferentially spaced lugs on the wheel rim arranged to engage the felly band of a wheel, said rim segment having slots with which certain of said lugs are arranged to interlock by a radial movement of the rim segment in respect to the wheel rim while maintaining its normal form to lock said rim segment to the wheel rim, and a lug on the rim segment arranged to engage said felly band.

In testimony whereof I affix my signature in presence of two witnesses.

WILLARD A. HAYDEN.

Witnesses:
 EVA E. KÖNIG,
 HARRY D. KILGORE.